United States Patent Office 3,341,577
Patented Sept. 12, 1967

3,341,577
MERCAPTO OXYALKYL AMINES
John C. James, Melrose, Robert J. Wineman, Concord, and Morton H. Gollis, Brookline, Mass., assignors to Monsanto Research Corporation, St. Louis, Mo., a corporation of Delaware
No Drawing. Filed Feb. 28, 1962, Ser. No. 176,409
7 Claims. (Cl. 260—501)

This invention relates to new chemical compounds, and more particularly, provides novel mercaptoalkyl oxyalkyl amines.

Aliphatic mercaptoalkyl oxyalkyl amines in which at least one of the amino N and oxy O atoms is exocyclic have not been known heretofore. Where these atoms are exocyclic, they can exert effects such as modifying the polarity, basicity and hydrophilicity of the compounds which are not observed when they form part of the same ring, and only the mercaptoalkyl group is exocyclic. Also, one or both of the amino N and oxy O atoms may carry hydrogen as a substituent, and thereby be susceptible of activity such as hydrogen bonding in a biological system, chemical reactivity and the like. These factors may produce protective effects in biological systems at sublethal levels.

It is an object of this invention to provide novel compounds.

A particular object of this invention is to provide novel mercaptoalkyl oxyalkyl amines in which at least one of the amino N and oxy O atoms is exocyclic.

Another object is to provide a novel method of protecting biological organisms from harmful conditions.

These and other objects will become evident from a consideration of the following specification and claims.

The compounds provided by this invention are N-mercaptoalkyl oxyalkyl amines in which at least one of the amino N and oxy O atoms is exocyclic; and alkanoate esters and acid addition salts thereof.

It has been found that administration of compounds of the stated type as described hereinafter protects biological organisms from the harmful effects of ionizing radiation.

The amines of this invention, by which is meant the said mercaptoalkyl amines as distinguished from their esters and acid addition salts, may be described as N-mercaptoalkyl oxyalkyl amines containing from 1 to 2 amino nitrogen atoms, and from 1 to 2 oxyalkyl radicals and from 1 to 2 mercaptoalkyl radicals attached to said nitrogen atoms, at least one of said oxy oxygen and said amino nitrogen atoms being exocyclic.

The invention includes a number of different types of mercaptoalkyl oxyalkyl amines, a comprehension of which will be facilitated by consideration of the specific classes included herein as follows.

A first class of compounds provided hereby are monoamines of the formula $$HS-R_1-N-R_2-(OR_2')_x$$
$$\phantom{HS-R_1-}|$$
$$\phantom{HS-R_1-N}R_1'$$

where each R is saturated aliphatic hydrocarbon, each R' is selected from H and saturated aliphatic hydrocarbon, and $x$ is an integer of from 1 to 3.

By "each" R is meant $R_1$ and $R_2$, and by "each" R', $R_1'$ and $R_2'$ and so forth.

If $R_2'$ is H, these are alcohols. Embodiments of the invention include secondary amino and tertiary amino mono-alkanols and polyalkanols as pointed out hereinafter, such as

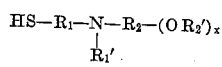

If $R_2'$ is hydrocarbon, the embodiment of the invention is an ether, such as $$HS-CH_2CH_2-NH-CH_2CH_2OCH_3$$

Where $x$ is 2 or 3, the $R_2'$ groups may be different, one being H and one aliphatic hydrocarbon, representing the embodiment of the invention comprising alkoxy alkanols, such as

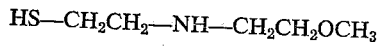

or each $R_2'$ may be the same, providing embodiments of the invention such as polyols like $$HS-CH_2CH_2-NH-C-(CH_2OH)_3$$

An embodiment of the invention included in the above-stated groups comprises alicyclic compounds, such as

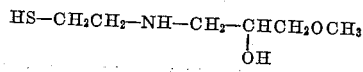

A further embodiment of this invention comprises heterocyclic alcohols and ethers, where two of the radicals symbolized by $R_1'$, $R_2$ and $R_2'$ are aliphatic hydrocarbon forming part of the same chain. These alcohols and ethers may be azacyclic, such as

or oxacyclic such as

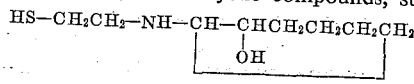

A second class of amines provided by this invention comprises diamines.

In a first embodiment of this class, the said diamines are alkylenediamines in which one of the amine nitrogen atoms is attached to a mercaptoalkyl radical, one of the nitrogen atoms is attached to an oxyalkyl radical, and all the other nitrogen substituents of the diamines are selected from H and saturated aliphatic hydrocarbons. These are represented by the formulas:

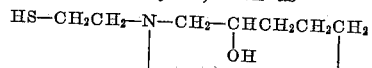

and

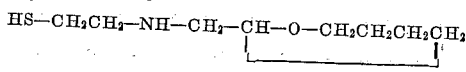

where each R is saturated aliphatic hydrocarbon, each R' is selected from the class consisting of hydrogen and saturated aliphatic hydrocarbon, and $x$ is an integer of from 1 to 3.

Like the above mono-amines, this class of diamines includes alcohols and ethers. Illustrative of such alcohols are the diamines of the above formula which are mercaptoalkylamino oxyalkylamines, with the oxyalkyl radical attached to both nitrogens, such as

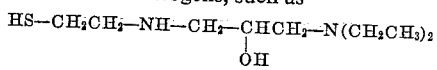

The embodiment of these diamines where the oxyalkyl radical is attached to one nitrogen and the mercaptoalkyl to the other may be illustrated by an ether such as

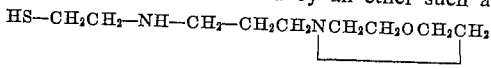

In a second embodiment of the class of diamines of this invention, the diamines are bis-N-mercaptoalkyl oxyalkane-diamines. They are represented by the general formula

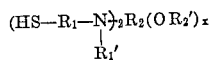

where each R is saturated aliphatic hydrocarbon, each R' is selected from H and saturated aliphatic hydrocarbon, and $x$ is an integer of from 1 to 3.

These diamines are illustrated, for example, by a member of the group comprising alkanediols of the stated type, such as

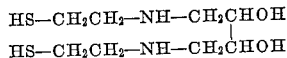

From the foregoing it will be evident that the present amines can be generally described as mercaptoalkyl oxyalkyl mono- and di-amines in which at least one of the oxy O and amino N atoms is exocyclic, and in which all the nitrogen substituents are selected from the class consisting of H, saturated aliphatic hydrocarbon, oxyalkyl and mercaptoalkyl radicals. Oxy designates connective oxygen, joining C to H or forming the sole bond between two C atoms; the presently provided amines are completely saturated, and free of C—O and C—N unsaturation as well as of carbon-to-carbon unsaturation. Further characterizing the amines of this invention is the fact that the nitrogen atoms thereof are at least two carbon atoms removed from hetero atoms (atoms other than C, including O and S). The 2-mercaptoalkyl and 3-mercaptoalkyl amines are preferred, and the compounds in which the nitrogen atom is beta to each of a sulfur-substituted carbon atom and an oxygen-substituted carbon atom are especially preferred. A particularly preferred class of the present amines comprises the compounds in which at least one of the O and N atoms is hydrogen substituted.

As noted above, this invention also provides esters of the stated amines. This includes esters of one or both of the mercaptan function and of the hydroxy function, where it is present in these amines. The esters included are those of these amines with alkanoic acids, that is, acids consisting of a saturated aliphatic hydrocarbon radical attached to the carboxylic function.

Each of the saturated aliphatic hydrocarbon radicals of the amines and their esters of this invention is hydrocarbon of up to 18 carbon atoms.

The acid addition salts of the compounds of this invention include salts of the stated amines and of their esters. The acid used to form these salts may be inorganic or organic protonic acids, of the usual type employed in the art to form amine salts, such as hydrochloric, for example. Physiologically acceptable salts of the amines with non-toxic acids, such as the hydrochlorides, are preferred.

The presently provided compounds are useful as pharmaceuticals; they are antiradiation drugs which protect animals against the lethal and toxic effects of ionizing radiation.

The scope of the present invention will be best appreciated from a consideration at this point of the following examples, which are illustrative but not limiting. In these examples, all parts are by weight unless otherwise noted.

*Example 1*

This example illustrates the compounds provided by this invention, by a tabular list of formulas, methods of preparation (Prep.) and characterizing properties of such compounds. In the tables, methods of preparation are indicated as A, B or C. Briefly, Method A is reaction of an oxyalkylamine with ethylene sulfide; Method B is reaction of a benzylthioalkylamine with an alkylene epoxide followed by debenzylation; and Method C is reaction of a benzylthioalkyl halide with an aminoalkanol followed by debenzylation. These methods are discussed more in detail hereinafter. Properties of the compounds tabulated refer to the hydrochloride salt of the amine where so indicated by the symbol HCl. Melting and boiling points are given in ° C. and millimeters (mm.) pressure; hyg. means hygroscopic and dec. means decomposition.

| | Prep. | Properties |
|---|---|---|
| HS—(CH$_2$)$_2$—NH—CH$_2$—CH$_2$OH | A | Solid, M.P. 55–60°; HCl an oil, $n_D^{20}$ 1.577. |
| HS—(CH$_2$)$_3$—NH—CH$_2$—CH$_2$OH | C | HCl hyg. oil. |
| HS—(CH$_2$)$_2$—NH—CH$_2$—CH$_2$CH$_2$OH | A | Solid B.P. 80°/0.1 mm.; HCl an oil. |
| HS—(CH$_2$)$_2$—NH—CH$_2$—CH$_2$CH$_2$CH$_2$OH | A | Liquid, B.P. 80–86°/0.02 mm., $n_D^{20}$ 1.5150; HCl an oil. |
| HS—(CH$_2$)$_2$—NH—CH—CH$_2$OH<br>$\quad\quad\quad\quad\quad\quad\quad$ $\|$<br>$\quad\quad\quad\quad\quad\quad\quad$ CH$_2$CH$_3$ | A | Liquid, B.P. 83–88°/0.25 mm., $n_D^{20}$ 1.5036; HCl hyg. oil, B.P.>300°. |
| HS—(CH$_2$)$_2$—NH—CH$_2$—CHCH$_3$<br>$\quad\quad\quad\quad\quad\quad\quad\quad\quad$ $\|$<br>$\quad\quad\quad\quad\quad\quad\quad\quad\quad$ OH | B | HCl v. hyg. semi-solid, M.P.<50°. |
| HS—(CH$_2$)$_3$—NH—CH$_2$—CHCH$_3$<br>$\quad\quad\quad\quad\quad\quad\quad\quad\quad$ $\|$<br>$\quad\quad\quad\quad\quad\quad\quad\quad\quad$ OH | C | HCl v. hyg. solid, M.P. about 90°. |
| HS—(CH$_2$)$_2$—NH—CH$_2$—CHCH$_2$CH$_3$<br>$\quad\quad\quad\quad\quad\quad\quad\quad\quad$ $\|$<br>$\quad\quad\quad\quad\quad\quad\quad\quad\quad$ OH | B | HCl v. hyg. solid, M.P. 83–91°. |
| HS—(CH$_2$)$_3$—NH—CH$_2$—CHCH$_2$CH$_3$<br>$\quad\quad\quad\quad\quad\quad\quad\quad\quad$ $\|$<br>$\quad\quad\quad\quad\quad\quad\quad\quad\quad$ OH | B | HCl M.P. 150–154°. |
| HS—(CH$_2$)$_2$—NH—CH$_2$—CH(CH$_2$)$_5$CH$_3$<br>$\quad\quad\quad\quad\quad\quad\quad\quad\quad$ $\|$<br>$\quad\quad\quad\quad\quad\quad\quad\quad\quad$ OH | B | HCl M.P. 154–156°. |
| HS—(CH$_2$)$_2$—NH—CH—CHCH$_3$<br>$\quad\quad\quad\quad\quad\quad\quad$ $\|$ $\quad\;\;$ $\|$<br>$\quad\quad\quad\quad\quad\quad\quad$ CH$_3$ OH | A | B.P. 64–67°/0.1 mm., $n_D^{20}$ 1.4985; HCl hyg. solid M.P. 60–62°. |
| HS—(CH$_2$)$_2$—NH—CH$_2$—C(CH$_3$)$_2$<br>$\quad\quad\quad\quad\quad\quad\quad\quad\quad$ $\|$<br>$\quad\quad\quad\quad\quad\quad\quad\quad\quad$ OH | B | HCl M.P. 165–167°. |
| HS—(CH$_2$)$_2$—NH—CH$_2$—C(CH$_3$)CH$_2$CH$_2$CH$_3$<br>$\quad\quad\quad\quad\quad\quad\quad\quad\quad$ $\|$<br>$\quad\quad\quad\quad\quad\quad\quad\quad\quad$ OH | A | B.P. 67–87°/0.08 mm., $n_D^{20}$ 1.4884; HCl M.P. 76–82°. |
| HS—(CH$_2$)$_2$—NH—CH—CHCH$_2$CH$_2$CH$_2$CH$_3$<br>$\quad\quad\quad\quad\quad\quad\quad\quad\;$ $\|$<br>$\quad\quad\quad\quad\quad\quad\quad\quad\;$ OH | B | HCl M.P. 100–103° (dec.). |

| | Prep. | Properties |
|---|---|---|
| HS—(CH$_2$)$_2$—N—CH$_2$—CH$_2$OH<br>    \|<br>    CH$_3$ | C | HCl hyg. oil. |
| HS—(CH$_2$)$_3$—N—CH$_2$—CH$_2$OH<br>    \|<br>    CH$_3$ | C | HCl an oil. |
| HS—(CH$_2$)$_2$—N—CH$_2$—CH$_2$OH<br>    \|<br>    CH$_2$CH$_3$ | A | B.P. 71°/0.5 mm., n$_D^{20}$ 1.4966; HCl an oil, n$_D^{20}$ 1.5262. |
| HS—(CH$_2$)$_2$—N—CH$_2$—CH$_2$OH<br>    \|<br>    CH(CH$_3$)$_2$ | C | HCl M.P. 74–76°. |
| HS—(CH$_2$)$_2$—N—CH$_2$—CN$_2$OH<br>    \|<br>    CH$_2$CH$_2$CH$_2$CH$_3$ | C | HCl an oil. |
| HS—(CH$_2$)$_2$—N—CH$_2$—CHCH$_2$CH$_2$CH$_2$<br>    \|_____\|<br>    OH | A | HCl M.P. >125°. |
| HS—(CH$_2$)$_2$—NH—CH$_2$—CH$_2$OCH$_3$ | A | B.P. 84°/17 mm., n$_D^{20}$ 1.4767; HCl M.P. 93–107°. |
| HS—(CH$_2$)$_2$—NH—CH$_2$—CH$_2$CH$_2$OCH$_3$ | A | B.P. 80°/4 mm., n$_D^{20}$ 1.4800; HCl M.P. 58–66.° |
| HS—(CH$_2$)$_2$—NH—CH$_2$—CH$_2$CH$_2$OCH(CH$_3$)$_2$ | A | B.P. 74°/0.8 mm. n$_D^{20}$ 1.4679; HCl M.P. 96–108°. |
| HS—(CH$_2$)$_2$—NH—CH$_2$—CH$_2$CH$_2$OCH(CH$_2$)$_6$CH$_3$<br>                                  \|<br>                                  C$_4$H$_9$-n | A | B.P. 138–140°/0.1 mm., n$_D^{20}$ 1.4668. |
| HS—(CH$_2$)$_2$—NH—CH$_2$—CH—O—CH$_2$CH$_2$CH$_2$CH$_2$<br>                           \|_____\| | A | B.P. 79–80°/0.3 mm., n$_D^{20}$ 1.5040; HCl M.P. 155–170° (dec.). |
| HS—(CH$_2$)$_2$—NH—CH$_2$—CHCH$_2$OH<br>                        \|<br>                        OH | C | HCl an oil. |
| HS—(CH$_2$)$_2$—NH—CH$_2$—CHOH<br>HS—(CH$_2$)$_2$—NH—CH$_2$—CHOH | B | 2HCl M.P. 227–229° (dec.). |
| HS—(CH$_2$)$_2$—NH—C(CH$_2$OH)$_3$ | C | HCl M.P. 110–112° C. |
| HS—(CH$_2$)$_2$—NH—CH$_2$—CHCH$_2$OCH$_3$<br>                        \|<br>                        OH | B | HCl hyg. oil. |
| HS—(CH$_2$)$_2$—NH—CH$_2$—CHCH$_2$O(CH$_2$)$_3$CH$_3$<br>                        \|<br>                        OH | B | Do. |
| HS—(CH$_2$)$_2$—NH—CH$_2$—CHCH$_2$O(CH$_2$)$_4$CH$_3$<br>                        \|<br>                        OH | B | HCl an oil. |
| HS—(CH$_2$)$_2$—NH—CH$_2$—CHCH$_2$N(CH$_2$CH$_3$)$_2$<br>                        \|<br>                        OH | A | B.P. 98–99°, n$_D^{20}$ 1.4942; HCl M.P. 191–192.5°. |
| HS—(CH$_2$)$_2$—NH—CH$_2$—CH$_2$CH$_2$NCH$_2$CH$_2$OCH$_2$CH$_2$<br>                              \|_____\| | A | B.P. 119°/0.4 mm., n$_D^{20}$ 1.5086; HCl M.P. 225–230° (dec.). |
| S—(CH$_2$)$_3$—NH—CH$_2$—CHCH$_2$CH$_3$<br>\|                             \|<br>COCH$_3$                   OCOCH$_3$ | ——— | HCl M.P. 72–74°. |

Example 2

This example illustrates Method A, ring-opening of an alkylene sulfide, employing a non-polar amine.

A solution of 56 parts of 3-methoxypropylamine in benzene is refluxed (about 85° C.) while a solution of ethylene sulfide is added gradually until 38 parts of the sulfide has been introduced. The reaction mixture is cooled and filtered, and solvent is removed from the filtrate by evaporation to leave a residue which is distilled. The fraction coming over at above 60° column head temperature at from 4.5 down to 0.5 mm. is recovered: $n_D^{20}$ 1.4800. This is 2-[(3-methoxypropyl)amino]ethanethiol.

Example 3

This example describes a procedure in the scope of Method A for preparation of one of the amines of this invention, where the initial amine is too polar to have significant solubility in benzene.

A 10% by volume solution of ethanol and benzene is prepared by combining 320 parts by volume of ethanol with 2880 parts by volume of benzene, and this mixture is dried azeotropically by refluxing. Then 560 parts by weight of 2-amino-ethanol is added to the solvent mixture and refluxing to dry the reaction mixture is continued. When the system has been substantially freed of water, introduction of ethylene sulfide is initiated, by dropwise addition of a solution of ethylene sulfide in benzene until 55 parts by weight of ethylene sulfide has been added over a period of between 3 and 4 hours. Refluxing is continued after the addition is complete for an hour and then solvent is removed from the reaction mixture by heating under vacuum. The clear oily residue is distilled and the fraction boiling at between 66 and 72° C. column head temperature at 0.015–0.025 mm. is recovered. This is 2-[(2-mercaptoethyl)amino]-ethanol. It is a solid at room temperature, melting at about 55–60° C.

Proceeding similarly, ethylene sulfide is reacted with 1-amino-3-diethylamino-2-propanol to provide 1-diethylamino-3-[(2-mercaptoethyl)amino]-2-propanol.

Example 4

This example describes preparation of the acid addition salt of an amine.

A solution of 37 parts of 2-[(2-mercaptoethyl)amino]-ethanol, prepared as described in Example 3, in 100 parts of water is blanketed with nitrogen, and the solution is stirred while 6 N hydrochloric acid is added until just sufficient has been introduced to make the solution acid. Then water is removed and the oily residue dried. The product is the hydrochloride salt of 2-[(2-mercaptoethyl)amino]ethanol, and oil, $n_D^{25}$ 1.5570.

Another useful technique for preparation of the amine salts of this invention comprises dissolving the amine in an organic solvent such as ethanol and adding acid thereto, employing a non-aqueous system. For example, dry hydrogen chloride may be passed as a gas into an ethanol solution of the amine, until the solution is saturated.

One or the other of the stated methods is employed to prepare the hydrochloride salts of the amines shown in the above table.

*Example 5*

This example illustrates the formation of a 2-[(benzylthio)alkylamino]alkanol in accordance with Method B of the invention.

A solution of 125 parts of 2-(benzylthio)ethylamine in methanol is maintained under a blanket of nitrogen and rapidly stirred while it is held at a temperature of 45–50° C. and about 40 parts of propylene oxide are introduced The reaction mixture is held for another half hour at 50°, and then solvent is removed by evaporation to leave a colorless oil. The oil is distilled through a Vigreaux column and the fraction boiling at about 146° C. column head temperature a 0.05 mm. is recovered. The product is 1 - [(2-benzylthio)ethyl]amino)-2-propanol. The oily amine is converted to the hydrochloride by dissolving a sample of the oil in absolute ethanol, saturating the solution with dry HCl and adding anhydrous ether to precipitate the acid addition salt.

Proceeding similarly, employing the appropriate alkylene oxide and 2-benzylthioethylamine or 3-benzylthiopropylamine, the following benzylthioalkylamines are prepared.

1-([2-(benzylthio)ethyl]amino)-2-butanol,
  B.P. 146–147°/0.07 mm., $n_D^{20}$ 1.5448, $d_4^{20}$ 1.060.
1-([3-(benzylthio)propyl]amino)-2-butanol,
  B.P. 152–153°/0.10 mm., $n_D^{20}$ 1.5447, $d_4^{20}$ 1.051.
1-([2-(benzylthio)ethyl]amino)-2-octanol, B.P. 166–168°/0.02 mm., M.P. 50–52°.
1-([2-benzylthio)ethyl]amino)-2-methyl-2-propanol,
  B.P. 125–127°/0.04 mm., M.P. 53–56°.
2-([2-(benzylthio)ethyl]amino)cyclohexanol,
  B.P. 164–160°/0.07 mm., M.P. 68–69°.
1,4-bis([2-(benzylthio)ethyl]amino)-2,3-butanediol,
  M.P. 91–109°.
1-([2-(benzylthio)ethyl]amino)-3-methoxy-2-propanol, B.P. 157°/0.15 mm., M.P. 84–56°.
1-([2-(benzylthio)ethyl]amino-3-butoxy-2-propanol,
  B.P. 165–166°/0.06 mm.
1-([2-(benzylthio)ethyl]amino)-3-pentoxy-2-propanol, B.P. 173–174°/0.04 mm., $n_D^{20}$ 1.5255, $d_4^{20}$ 1.043.

*Example 6*

This example illustrates preparation of a benzylthio alkylamine in acordance with Method C of this invention.

A reaction mixture is prepared by combining 185 parts of benzyl 2-chloroethyl sulfide and 75 parts of 1-amino-2-propanol in ethanol with about 65 parts of sodium carbonate. The reaction mixture is refluxed under nitrogen for 18 hours. The solvent is removed, water is added, and concentrated HCl is then introduced to bring the solution to an acid pH. The acidic mixture is extracted with ether and the resulting aqueous layer neutralized with 50% aqueous NaOH to form an oil which is extracted with ether. The extract is dried over sodium sulfate, the ether is removed and the oil distilled. The fraction distilling over at 133–135° C./0.13 mm., column head temperature is dissolved in ethanol, and the solution is saturated with dry HCl. Addition of ether and chilling precipitates the hydrochloride salt of 1-([2-(benzylthio)ethyl]amino)-2-propanol. This hydrochloride salt melts at 107–108° C. A mixed melting point of this hydrochloride salt and the hydrochloride prepared as described in Example 5 is the same, thus corroborating the structure assigned to the product of Example 5. The salts also have identical infrared spectra.

Using a substantially similar procedure, reaction of benzyl 2-chloroethylsulfide or benzyl 3-chloropropyl sulfide with appropriate amines produces the following oxyalkyl benzylthioalkyl amines:

2-([3-(benzylthio)propyl]amino)ethanol, B.P. 149–151°/0.010 mm., $n_D^{20}$ 1.5635, $d_4^{20}$ 1.091.
1-([3-(benzylthio)propyl]amino)-2-propanol,
  $n_D^{20}$ 1.5510, $d_4^{20}$ 1.062.
2-([2-benzylthio)ethyl]methylamino)ethanol,
  $n_D^{20}$ 1.5498, $d_4^{20}$ 1.072.
2-([3-(benzylthio)propyl]methylamino)ethanol, B.P. 131°/0.055 mm., $n_D^{20}$ 1.5506, $d_4^{20}$ 1.060.
2-([2-benzylthio)ethyl]isopropylamino)ethanol,
  B.P. 140–142°/0.15 mm., $n_D^{20}$ 1.5393, $d_4^{20}$ 1.042.
2-([2-(benzylthio)ethyl]-n-butylamino)ethanol,
  $n_D^{20}$ 1.5383, $d_4^{20}$ 1.031.
3-([2-(benzylthio)ethyl]amino)-1,2-propanediol,
  B.P. 180–190°/0.1 mm., $n_D^{20}$ 1.5710.
2-([2-(benzylthio)ethyl]amino)-2-hydroxymethyl-1,3-propanediol hydrochloride, M.P. 108–110°.

*Example 7*

This example illustrates conversion of a benzylthioalkyloxyalkylamine prepared as described in Examples 5 and 6 to the corresponding mercaptan, in accordance with Methods B and C of this invention.

Enough sodium is added to anhydrous liquid ammonia to produce the characteristic blue color of sodium in liquid ammonia and then 45 parts of 1-([2-(benzylthio)ethyl]amino)-2-butanol is mixed with the ammonia and 9 parts of sodium are added, portion-wise, to the ammonia over a period of about an hour. Addition of the last of the sodium after the last of the amine causes its blue color to persist, showing completion of the reaction. Ammonia is now removed by evaporation leaving a residue of finely divided powder. The residue is stirred in an ice bath while it is acidified with aqueous HCl. An oily layer is separated and discarded, the acidic mixture is extracted with ether, and the ether extracts are discarded. The aqueous layer is then filtered, and evaporated down. The residue from this procedure is extracted with isopropanol and the extract concentrated to give a white waxy solid, very soluble in alcohols ranging from methanol to butanol and in acetonitrile. The solid is dissolved in isopropanol and filtered to free it of inorganic salt (ammonium and sodium chlorides), and then the solvent is removed to isolate the hydrochloride salt of 1-[(2-mercaptoethyl)amino]-2-butanol as a waxy white solid, M.P. 83–91° C.

Calc. for $C_6H_{16}ClNOS$: C, 38.80; H, 8.69; Cl, 19.09; N, 7.54; S, 17.27. Found: C, 39.1; H, 8.6; Cl, 18.8; N, 7.8; S, 17.1.

Proceeding similarly, the benzylthioalkylamines mentioned above in Examples 5 and 6 are debenzylated to provide the corresponding mercaptoalkylamines.

*Example 8*

This example describes preparation of an ester in accordance with the invention.

Addition of 24 parts of acetyl chloride to 6 parts of 1-[(3-mercaptopropyl)amino]-2-butanol hydrochloride, providing a 10:1 molar ratio produces spontaneous reflux of the mixture accompanied by vigorous evolution of hydrogen chloride. The resulting solution is maintained at reflux for 2½ hours, after which excess acetyl chloride is removed. Trituration of the oily residue with anhydrous ether produces the diacetate of 1-[(3-mercaptopropyl)amino]-2-butanol hydrochloride as a white solid having an infrared spectrum exhibiting two strong carbonyl bands, one attributed to the oxygen ester at 5.7μ and the other to the thio ester at 5.9μ.

Proceeding similarly, addition of acetyl chloride to 2 - [(2 - methoxyethyl)aminoethanethiol produces the mono-acetate thereof.

To provide the mono-propionate of 2-[(2-mercaptoethyl)amino]ethanol, ethanolamine hydrochloride is esterified with propionic anhydride to provide 2-aminoethanol propionate hydrochloride, this is neutralized with base to provide the free amine, and the resulting product is then mercaptoethylated with ethylene sulfide in a mixed solvent system following the procedure of Example 3.

Generally similar procedures provide the mono and diesters of others of the presently provided amines.

*Example 9*

This example illustrates use of amines provided by this invention.

The hydrochloride salt of 1-[(2-mercaptoethyl)amino]-2-propanol is dissolved in water to provide a physiologically acceptable solution having a pH between 7 and 7.5, at a concentration of 3%. The solution is injected subcutaneously into mice, at a level of 300 mg./kg. body weight (calculated on free amine), which level has previously been determined to be well below a lethal dosage. Fifteen minutes after the injection, the injected animals are exposed to X-ray radiation, along with other mice which have received an injection of neutralized aqueous HCl, as a control. The test animals are then held in cages and fed and watered while they are observed. At a radiation level of 600 roentgens, 55% of the controls are dead in from 12 to 19 days; at 825 roentgens, all the controls are dead in within 2 weeks. All of the animals receiving the drug injection before exposure to the radiation, however, are alive at the end of the full 30 day test period.

Good protective results are similarly produced using a 350–500 mg./kg. dosage of the hydrochloride salts of 2-[(2-mercaptoethyl)amino]ethanol,
3-[(2-mercaptoethyl)amino]-1,2-propanediol,
1-[(2-mercaptoethyl)amino]-3-methoxy-2-propanol, and
1,4-bis[(2-mercaptoethyl)amino]-2,3-butanediol.

Referring now to the scope of this invention, the mono-amines provided hereby include mono-oxy and poly-oxy compounds composing the sub-classes of alcohols, ethers and alkoxyalkanols.

The alcohols which are monohydric and acyclic are illustrated by mono-amines including secondary amines such as 2-[(2-mercaptoethyl)amino]ethanol,
2-[(2-mercaptopropyl)amino]ethanol,
2-[(2-mercaptoethyl)amino]-1-propanol,
3-[(2-mercaptoethyl)amino]-1-propanol,
3-[(2-mercaptoethyl)amino]-n-butanol,
2-[(2-mercaptoethyl)amino]-1-butanol,
3-[(2-mercaptoethyl)amino]-2-propanol,
1-[(3-mercaptopropyl)amino]-2-propanol,
1-[(2-mercaptodecyl)amino]-2-butanol,
1-[(3-mercaptopropyl)amino]-2-butanol,
1-[(2-mercaptoethyl)amino]-2-octanol,
2-[(2-mercaptoethyl)amino]-3-octadecanol,
1-[(2-mercaptoethyl)amino)-2-methyl-2-propanol,
1-[(2-mercaptoethyl)amino]-2-methyl-2-pentanol;

and tertiary amines such as

2-[(2-mercaptoethyl)methylamino]ethanol,
2[(3-mercaptopropyl)methylamino]ethanol,
2-[nonyl(2-mercaptoethyl)amino]ethanol,
2-[isopropyl(2-mercaptoethyl)amino]ethanol,
2-[butyl(2-mercaptoethyl)amino]ethanol, and the like.

The alcohols which are monohydric and cyclic are illustrated by alicyclic mono-amines such as 2-[(2-mercaptoethyl)amino]cyclohexanol,
2-[(3-mercaptoethyl)methylamino]cyclohexanol, and
4-ethyl-2-[(2-mercaptoethyl)amino]cyclopentanol;

and by heterocyclic mono-amines including an exocyclic oxygen atom such as 1-(2-mercaptoethyl)-3-piperidinol,
1-(2-mercaptoethyl)-4-piperidinol,
1-(2-mercaptoethyl)-3-piperidinemethanol and so forth.

The class of mono-oxy mono-amines of the invention which are ethers include, for example 2-[(2-methoxyethyl)amino]ethanethiol,
2-[(3-methoxypropyl)amino]ethanethiol,
2-[(3-isopropoxypropyl)amino]ethanethiol,
2-[(1-dodecoxy-2-butyl)amino]ethanethiol,
2-[(3-methoxy-2-butyl)amino]ethanethiol,
2-[(1-methoxy-2-propylamino]ethanethiol,
3-[(2-isopropoxypropyl)amino]propanethiol,
2-[(2-methoxybutyl)amino]ethanethiol,
3-[(2-isoamyloxybutyl)amino]propanethiol,
2-[(2-methoxyoctyl)amino]ethanethiol,
2-[(2-isooctyloxy-3-butyl)amino]ethanethiol,
2-[(2-methoxy-2-methylpropyl)amino]ethanethiol,
2-[(2-methoxy-2-methylpentyl)amino]ethanethiol,
2-[(2-methoxycyclohexyl)amino]ethanethiol,
2-[(2-ethoxyethyl)methylamino]ethanethiol,
2-[(1-methoxy-2-propyl)methylamino]ethanethiol,
3-[(2-methoxyethyl)methylamino]propanethiol,
2-[(2-cyclohexyloxyethyl)isopropylamino]ethanethiol,
2-[butyl(2-methoxyethyl)amino]hexadecanethiol,
2-(4-methoxypiperidinyl)ethanethiol, and so forth.

Still another class of mono-amines provided by this invention are poly-oxy compounds, containing more than one connective oxygen atom.

This class is inclusive, firstly, of poly-oxy compounds comprising polyols. Illustrative polyols of this nature, comprising mercaptoalkylaminoalkanepolyols, include 3-(2-mercaptoethylamino)-1,2-propanediol,
3-[(2-mercaptoethyl)amino]-1,2-butanediol,
2-[(2-mercaptoethyl)amino]-1,3-butanediol,
3-[(3-mercaptopropyl)amino]-1,2-propanediol,
3-[(4-mercaptobutyl)amino]-1,2-propanediol,
2-[(2-mercaptoethyl)amino]-1,4-butanediol,
2-[(3-mercaptopropyl)amino]-3-methyl-1,4-butanediol,
3-[(2-mercaptoethyl)amino]-1,2-octadecanediol,
4-[(2-mercaptoethyl)amino]-1,2-cyclohexanediol,
3-[(2-mercaptoethyl)methylamino]-1,2-propanediol,
2-[(2-mercaptoethyl)amino]-2-(hydroxymethyl)-1,3-propanediol,
2-[(2-mercaptoethyl)amino]-1,3-propanediol,
3-[(3-mercaptopropyl)amino]-3-(2-hydroxyethyl)-1,5-pentanediol, and the like.

The mono-amino poly-oxy compounds of the invention also include alkoxyalkanols such as 1-[(2-mercaptoethyl)amino]-3-methoxy-2-propanol,
1-[(3-mercaptopropyl)amino]-3-butoxy-2-propanol,
1-[(2-mercaptoethyl)amino]-3-pentoxy-2-propanol,
1-[ethyl(2-mercaptoethyl)amino]-2-cyclohexyloxy-2-propanol,
5-[(2-mercaptoethyl)amino]-4-methyl-1-methoxy-2-pentanol,
1-[(2-mercaptoethyl)aminomethyl]-5-hydroxypyran, and the like; and polyethers including, for example, 2-[(2,3-dimethoxypropyl)-amino]ethanethiol,
2-[(2,3-diethoxypropyl)amino]ethanethiol,
3-[(2,3-dimethoxypropyl)amino]propane-1-thiol,
4-[(2,3-dibutoxypropyl)amino]butane-1-thiol,
2-[(1,2-dimethoxy-3-butyl)amino]-ethanethiol,
2-[(2,3-dipentoxypropyl)amino]ethanethiol and so forth.

The diamines of the invention include as a first class mono(mercaptoalkyl)oxyalkyl diamines which in turn include N-mercaptoalkyl N'-oxyalkyl alkylene diamines of the formula

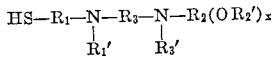

and N-mercaptoalkyl oxyalkylene diamines of the formula

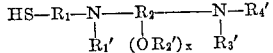

where $x$ is 1 to 3, each R is aliphatic hydrocarbon and each R' is H or aliphatic hydrocarbon as defined above.

Referring to the alkylene diamines, these include alcohols such as 3-(2-[(2-mercaptoethyl)amino]ethylamino)-2-butanol,
3-(2-[(2-mercaptoethyl)amino]-1-methylpropylamino)-2-butanol,
2-(2-[(2-mercaptoethyl)amino]ethylamino)cyclohexanol, and so forth; and ethers such as 2-[(2-methoxyethyl)amino]-ethylamino)ethanethiol,
2-(2-[(3-methoxypropyl)amino]ethylamino)-ethanethiol,
2-(3[(2-propoxyethyl)amino]propylamino)ethanethiol,
2-(3-[(4-morpholinyl)propyl]amino)ethanethiol,
2-[(6-[(methoxymethyl)amino]hexyl)amino]ethanethiol and so forth. The oxyalkylene diamines are illustrated by alcohols such as 1-dimethylamino-3-[(2-mercaptoethyl)amino]-2-propanol,
1-diethylamino-3-[(2-mercaptoethyl)amino]-2-propanol,
1-methylamino-3-[(2-mercaptoethyl)amino]-2-propanol, and ethers such as 2-[(3-dimethylamino-2-methoxypropyl)amino]ethanethiol,
2-(2-morpholinylmethylamino)ethanethiol,
2-[(6-dimethylamino-3-methoxyhexyl)amino]ethanethiol and so forth.

A further embodiment of the diamines of the invention comprises bis(mercaptoalkyl)oxyalkylene diamines. These include alcohols which are monohydric such as 1,3-bis[(2-mercaptoethyl)-amino]-2-propanol,
1,3-bis[(3-mercaptopropyl)amino]-2-methyl-2-propanol, and the like, and those which are polyhydric such as 1,4-bis[(2-mercaptoethyl)amino]-2,3-butanediol,
1,4-bis[(3-mercaptopropyl)amino]-2,3-butanediol,
1,5-bis[(2-mercaptoethyl)-amino)-2,4-pentanediol,
1,4-bis[(2-mercaptoethyl)amino]-2-methyl-2,3-butanediol,
1,4-bis[isopropyl(2-mercaptoethyl)amino]-2,3-butanediol,
2,5-bis[(3-mercaptopropyl)amino]-3,4-hexanediol,
1,4-bis[(2-mercaptoethyl)amino]-2,3-dimethyl-2,3-butanediol,
2,5-bis[(2-mercaptoethyl)amino]-1,3,4-hexanetriol,
1,4-bis[(2-mercaptoethyl)methylamino]-2,3-butanediol, and so forth.

The stated diamines also include, for example, alkoxyalkanols such as 1,4-bis[(2-mercaptoethyl)amino]-2-methoxy-3-butanol,
1,4-bis[(3-mercaptopropyl)amino]-2-ethoxy-3-butanol,
1,4-bis[(2-mercaptoethyl)amino]-3-pentoxy-2-butanol,
1-[(2-mercaptoethyl)amino]-4-[(3-mercaptopropyl)amino]-3-butoxy-2-butanol,
3,6-bis[(2-mercaptoethyl)amino]-5-methoxy-4-octanol, and so forth; ethers such as N,N'-bis(2-mercaptoethyl)-3-methoxy-1,6-hexanediamine, and so forth.

Still another class of novel compounds provided by the invention are esters of the mercaptans of the invention, wherein a hydroxy radical, a mercapto radical, or both such radicals are esterified by an acyl radical of the formula RCO— where R is a saturated aliphatic hydrocarbon radical. Thus, for example, the invention includes esters such as 2-[(2-mercaptoethyl)amino]ethanol diacetate,
2-[(3-mercaptopropyl)amino]ethanol diacetate,
1-[(2-mercaptoethyl)amino]-2-propanol diacetate,
1-[(3-mercaptopropyl)amino]-2-butanol diacetate,
2-[(2-mercaptoethyl)amino]-4-methylcyclohexanol diacetate,
2-[isopropyl(2-mercaptoethyl)amino]ethanol diacetate,
2-[(2-mercaptoethyl)amino]ethanol dipropionate,
3-[(2-mercaptoethyl)amino]-1-propanol dibutyrate,
3-[(2-mercaptoethyl)amino]-2-butanol dihexanoate,
2-[(2-mercaptoethyl)amino]ethanol dioctanoate,
2-[(2-acetoxyethyl)amino]ethanethiol,
2-[(2-acetylthioethyl)amino]ethanol,
2-[(3-acetylthiopropyl)amino]-1-methyl-1-cyclohexanol, and so forth.

Referring now to the preparation of the presently provided compounds, the useful kinds of synthetic methods for producing the aminoalkanols and aminoalkyl ethers of the invention may be regarded as including two general types. The first is a ring-opening reaction, and the second is a condensation reaction.

Ring-opening reactions are adapted to introduce mercaptoalkyl and hydroxyalkyl radicals into amines to provide the compounds of the invention. Ring opening of ethylene sulfide may be used to supply the mercaptoethyl radical, and ring opening of ethylene oxide or a like alkylene oxide, to introduce a hydroxyalkyl radical.

Thus, a convenient method for the preparation of the 2-mercaptoethylamino compounds of the invention is the reaction of ethylene sulfide with an oxyalkylene-substituted amine. This is the method identified in the table above as Method A. For example, the reaction of 2-aminoethanol with ethylene sulfide may be employed to produce addition with ring opening, forming 2-[(2-mercaptoethyl)amino]ethanol. A difficulty with such a synthesis is the fact that polar hydroxyalkyl-substituted amines tend to produce polymerization of ethylene sulfide with itself, and the ethylene sulfide polymer may contaminate the product or indeed, constitute the major or sole product of contact of ethylene sulfide with the polar amine. This difficulty can, however, be overcome by a method set forth in co-pending application S.N. 176,408, now U.S. Patent 3,231,612, filed by John C. James concurrently herewith and assigned to the same assignee as the present invention, in accordance with which N-mercaptoalkyl derivatives of polar amines are prepared by contacting ethylene sulfide with a polar amine in a mixed solvent system. In accordance with this method, the ethylene sulfide is introduced gradually into a reaction mixture comprising the oxyalkyl amine and a solvent mixture of a major proportion of a solvent of low polarity such as benzene and a minor proportion of a solvent of relatively high polarity such as ethanol. It is found that this procedure substantially obviates formation of ethylene sulfide polymer and produces satisfactory yields of the desired 2-mercaptoethyloxyalkyl amines.

The amines which may advantageously be employed in the reaction with ethylene sulfide, whether polar or not, are those containing the residue of the desired product, to which the mercaptoethyl radical need merely be added as an amine nitrogen substituent to produce the compounds of the invention. Thus, useful oxyalkyl amines which may be employed for reaction with ethylene sulfide to produce mercaptoalkylaminoalkanols, ethers, and the like in accordance with this invention comprise, for example, alkanols such as 2-aminoethanol,
3-amino-1-propanol,
4-amino-1-butanol,
2-amino-1-butanol,
1-amino-2-butanol,
1-amino-2-octanol,
amino-tert-butanol,
1-amino-2-methyl-2-pentanol,
2-aminocyclohexanol,
2-methylaminoethanol, 2-isopropylaminoethanol, 2-piperidinol, and so forth; alkoxyalkylamines such as 2-methoxyethylamine,
3-methoxypropylamine,
3-isopropoxypropylamine
1-aminomethyltetrahydropyran, and so forth; polyoxyamines such as 3-amino-1,2-propanediol,
1-amino-2,3-butanediol,
1-amino-3-methoxy-2-propanol,
1-amino-3-butoxy-2-propanol,
1-amino-3-pentoxy-2-propanol,
2-(2-methoxyethyloxy)ethylamine;

and oxypolyamines such as 1-amino-3-dimethylamino-2-propanol,
4-(3-aminopropyl)morpholine,
N-(2-methoxyethyl)ethylenediamine, and so forth. The products of the reaction in this case will be compounds provided by this invention as stated above, such as 2-[(2-mercaptoethyl)amino]ethanol.

Oxyalkyl amines such as those just mentioned can also be reacted with propylene sulfide to make the mercaptopropylamino oxyalkyl compounds of the invention. However, this compound, unlike ethylene sulfide, may produce a mixture of isomers as product. Therefore, a preferred method of making such mercaptopropylamino compounds is the condensation reaction discussed hereinafter.

Ring-opening reactions for making the compounds of this invention, besides the ethylene sulfide reaction discussed above, include ring opening of epoxyalkanes. By epoxyalkanes is meant vic-epoxy-alkanes, where the epoxy oxygen is attached to each of two adjacent carbon atoms. They may contain one or more than one such epoxy configuration.

In preparation of the compounds of this invention, such epoxides will be reacted with an alkylamine. In general, this cannot be a mercaptoalkylamine, because the mercapto group is subject to attack under the conditions employed to react the cyclic oxide with the amine. However, if the hydrogen attached to sulfur in a mercaptoalkyl amine is replaced by an aralkyl radical like benzyl, the sulfur atom is blocked and protected. Debenzylation can be later effected, as discussed hereinafter, to produce the corresponding mercaptan. The steps of reaction of an epoxide with a benzylthioalkylamine followed by debenzylation comprise the method identified in the tables above as Method B.

Some of the products of the stated first step of Method B and of Method C as described hereinafter are new compounds. They are described and claimed in copending applications S.N. 176,406, now U.S. Patent 3,231,612, S.N. 176,410, now U.S. Patent No. 3,197,506, and S.N. 176,411, each filed concurrently herewith by Robert J. Wineman, Morton H. Gollis, and John C. James.

Thus the presently contemplated method comprises opening the ring of a vic-epoxyalkane in reaction with a benzylthioalkylamine. The method can be illustrated, for example, by reference to the reaction of propylene oxide with a benzylthioalkylamine, as shown in the following equation:

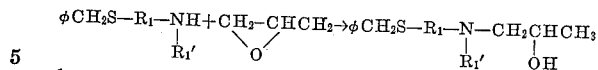

where R and R' are as defined above and $\phi CH_2$ is the benzyl radical. It has been established that the epoxy ring opens at the least substituted carbon atom, so that epoxides such as 1,2-epoxypropane can be employed to produce a secondary alkanol. Polyols of the present invention can be produced, for example, by employing a diepoxyalkane such as butadiene diepoxide, or an epoxyalkanol such as glycidol. Reaction of an epoxide as herein contemplated can usefully be employed to produce (by way of debenzylation of the benzylthio compound) not only the hydroxy compounds of this invention, but also the alkoxyalkanols, by employing an alkoxy epoxy alkane as the reactant.

Thus, useful epoxides comprise vic-epoxyalkanes such as ethylene oxide,
propylene oxide,
1,2-butylene oxide,
2,3-butylene oxide,
2-methylpropylene oxide,
2-methyl-1,2-pentylene oxide,
cyclohexene oxide,
butadiene diepoxide,
2,3:4,5-diepoxyhexane,
1,2:3,4-diepoxy-cyclohexane,
2,3-epoxy-1-propanol,
3,4-epoxy-1-butanol,
2,3-epoxypropyl n-butyl ether,
2,3-epoxypropyl 2-methylbutyl ether,
2,3-epoxycyclohexyl methyl ether, and so forth.

The benzylthioalkylamines with which the epoxy compounds may be reacted in making the presently provided compounds are benzylthioalkyl amines wherein alkyl is saturated aliphatic hydrocarbon, the amine nitrogen atom carries at least one hydrogen substituent, and any N substituent other than H is saturated aliphatic hydrocarbon. Thus, useful amines include, for example 2-(benzylthio)ethylamine,
2-(benzylthio)-N-methylethylamine,
2-(benzylthio)-N-ethylethylamine,
2-(benzylthio)-N-propylethylamine,
3-(benzylthio)-1-propylamine,
2-(benzylthio)-1-butylamine,
2-(benzylthio)-1-propylnonylamine,
3-(benzylthio)-N-cyclohexyl-1-propylamine and so forth. Products of such reaction will comprise, for example, 1-([2-(benzylthio(ethyl]amino)-2-propanol,
1-([2-benzylthio)ethyl]amino)-3-methoxy-2-propanol,
1-([3-(benzylthio)propyl]amino)-2-propanol,
1,4-bis([2-(benzylthio)ethyl]amino)-2,3-butanediol, and so forth, which can be converted to corresponding mercaptans by debenzylation as described hereinafter.

The conditions for conducting the stated ring-opening reactions may consist merely of contacting the cyclic compound with the other reactant. Reaction tends to be immediate and vigorous. The temperature may range from above freezing to below the decomposition temperature of the reaction mixture components, broadly; more particularly, holding the reaction temperature at 50–100° C. is favorable. The reaction may be exothermic, and dropwise addition of the cyclic compound to the reaction mixture is usually preferable.

Generally, not more than about one equivalent of the cyclic compound will be introduced per equivalent of amine, where one equivalent is one mole divided by the number of reactive amine groups and of epoxy groups, respectively; and less may be used, where incomplete conversion is acceptable. Solvents and diluents are desirable, and useful solvents and diluents include, for example, hydrocarbons such as benzene and hexane; ethers such as diethyl ether and dioxane; alcohols such as methanol and ethanol, and so forth. The use of the mixed solvent system for reaction of ethylene sulfide with polar amines has been mentioned above. Maintaining an atmosphere of nitrogen over the reaction mixture is useful in preventing access of air. Atmospheric pressures are suitable, though variation of pressure above and below atmospheric may be employed if desired.

Referring now to the above-mentioned condensation reaction employed to prepare the present compounds, this is a condensation of a benzyl haloalkyl sulfide with an amino-substituted oxyalkyl compound having at least one free amine hydrogen substituent. The condensation releases hydrogen halide to produce a benzylthioalkylamino oxyalkyl compound which can be debenzylated as described hereinafter to the corresponding mercaptoalkylamino oxyalkyl compound. This is Method C referred to above. Useful benzyl haloalkyl sulfides include for example, bromides, chlorides and iodides such as benzyl 2-chloroethyl sulfide,
benzyl 3-chloropropyl sulfide,
benzyl 3-bromopropyl sulfide,
benzyl 3-iodobutyl sulfide,
benzyl 2-chlorobutyl sulfide,
benzyl 2-chloropropyl sulfide, and so forth. Useful amino oxyalkyl compounds include, for example, 1-amino-2-propanol,
3-amino-1-propanol,
1-amino-3-butanol,
1-amino-2-butanol,
1-amino-2-methyl-2-propanol,
1-amino-3-methyl-2-butanol,
1-methylamino-3-methyl-3-butanol,
2-amino-3-hexanol,
3-amino-2-methoxy-1-propanol,
3-methoxy-1-propylamine,
3-(hydroxymethyl)piperidine,
3-amino-1,2,4,-butanetriol,
3-amino-1,2-propanediol,
2-amino-1,3-butanediol,
2-amino-2-(hydroxymethyl-1,3-propanediol,
2-(methylamino)ethanol,
2-(ethylamino)ethanol,
2-(propylamino)ethanol,
2-(ethylamino)-1-propanol,
2-(butylamino)-1-butanol,
2-[(2,3-dimethylbutyl)amino]ethanol,
3-(methylamino)-2,2-dimethyl-1-propanol,
3-methoxy-1,6-hexanediamine and so forth.

Products of the condensation of the amine with the halide will correspond to the mercaptans of this invention, except that a benzylthio group will appear in place of the mercaptan group. Thus, the products will include, for example, amines such as N-(2-benzylthioethyl)-3-hydroxypiperidine,
N-(2-benzylthioethyl)-3-hydroxy-4-pipecoline,
N-(2-benzylthioethyl)-3-methoxy-1-propylamine,
2-[(3-benzylthiopropyl)amino]ethanol and the like.

Conditions for the preparation of the compounds of the present invention by the condensation reaction may comprise merely contacting the halide with the amine. Their ratio may be about that of a 1:1 equivalency, calculated on the number of reactive halogen atoms and amine radicals they respectively contain, or an excess of either may be used.

Acid is released by the condensation reaction, and desirably the halide and amine are contacted in the presence of a base. Useful bases are salts containing oxygen in the anion including hydroxides such as KOH, oxides such as lime, carbonates such as sodium carbonate; tertiary amines like triethylamine and pyridine; and so forth. The amount of base used will generally be approximately the calculated quantity needed to neutralize acid released, but more, such as up to 5 times the theoretical equivalent, may be used if desired.

As to the other conditions of reaction, the presence of solvents or diluents is desirable. These preferably are polar solvents, able to dissolve the base, such as the dimethyl ether of diethylene glycol, alcohols such as ethanol, and so forth. Temperatures may range from above freezing to below the decomposition temperatures of reaction mixture components; a range of 50–150° C. is generally suitable. Pressure may also vary over a wide range, such as from sub-atmospheric pressures of down to, say, 50 millimeters Hg, up to superatmospheric pressures of 1000 pounds per square inch or above. Generally, atmospheric pressures are suitable. It is usually desirable, however, to maintain a nitrogen atmosphere over the surface of the reaction mixtures to avoid access of air.

Referring now to the debenzylation of the benzylthioalkylamines produced in accordance with the above described procedures, this is effected by adding sodium to a stirred solution of the S-benzyl compound in liquid ammonia. Alternate addition of the sodium and the S-benzyl compound may be used to overcome the insolubility of the higher molecular weight S-benzyl mercaptoalkylamino alkanols in liquid ammonia. Sufficient total sodium should be used to produce and maintain the characteristic dark blue color of a sodium-liquid ammonia solution for a measurable time, such as at least about ½ hour, after the addition is complete. The ammonia may then be allowed to evaporate at ambient pressure and then final traces removed under reduced pressure (water pump), after which the reaction mixture will be acidified. The residue, to avoid oxidation, is desirably blanketed with nitrogen until acidification is accomplished. Acidification will be desirably preceded by adding water to the reaction mixture, to solubilize the residue, while the reaction mixture is cooled, as for example by chilling in an ice bath. The acid used to acidify the mixture may be any strong proton donor which will form an acid salt with the amine. Desirably it will be a physiologically acceptable acid forming a physiologically acceptable addition salt with the amine. Thus for example, useful acids include inorganic acids such as concentrated hydrochloric acid, and organic acids such as maleic acid. Depending on the intended use of the product, indeed a toxic acid, such as hydrobromide or oxalic acid, may be used if desired. To form the addtiion salt, sufficient acid will be added to provide one mole for each mole of amine groups in the product, the amount necessary for this depending on whether the product is a monoamine or a polyamine. Excess acid may be used. The acidic mixture may now be extracted with a solvent such as ether for the removal of organic byproducts. The acidic aqueous portion is a solution of the acid salt of the organic amine mixed with inorganic salt, such as sodium chloride. The organic amine salt may be separated by evaporating the aqueous acid solution under reduced pressure to dryness, and then extracting the residue with a solvent such as an alcohol for the organic amine salt. Suitable solvents include methanol, ethanol and isopropyl alcohol. Concentration of the extract separates the inorganic salts as a precipitate which can be removed by filtration, whereupon the solvent can be removed from the filtrate to yield the amine hydrochloride.

Generally, isolation of the amine as a salt such as the hydrochloride salt is desirable. However, if desired, the amine itself may be recovered from the debenzylation reaction mixture or may be produced by treatment of the hydrochloride salt, made as described above, with alkali, such as NaOH, thus freeing the amine. In general, though, the acid addition salts of these amines are the desirable form thereof; because of their water solubility, they are better adapted than the free amine for use in physiological applications such as administration of parenteral injections to animals. For such use, the addition salts selected will be non-toxic salts such as the hydrochloride, maleate or the like. Practically any protonic acid can be used to form the acid addition salt, and useful acids, including physiologically acceptable acids, for forming salts with amines are known in the art.

Referring now to the further embodiment of this invention comprising esters of the above-discussed mercaptoalkylamines, the amines are desirably employed to make the esters in the form of the stated salts. Usual means of esterification will be employed, such as reaction of the anhydride or acid halide of the selected acid with the amine. Thus, for example, useful acyl halides include acetyl chloride, propionyl chloride, butyryl chloride, caproyl chloride, capryl chloride, and so forth. Useful anhydrides include for example acetic anhydride, propionic anhydride, butyric anhydride, valeric anhydride, enanthic anhydride, caprylic anhydride and so forth. In general, the acid derivative and the amine will be contacted in the calculated theoretical amounts, approximately. The formation of the ester by reaction of the acid halide or anhydride with the amine may or may not require heating, but generally proceeds rapidly at temperatures below about 100° C.

The various mercaptoalkylamines, esters and their addition salts provided by this invention range from mobile liquids to crystalline solids. The acid addition salts range from moderately to very soluble in lower alkanols such as methyl, ethyl and isopropyl alcohol; they are very soluble in water, and many of them are quite hygroscopic. They are useful for a wide variety of industrial, pharmaceutical and agricultural applications. They have demonstrated activity in protecting microorganisms and mammals against the harmful effects of ionizing radiation. The oxylalkyl portion of the molecules of these compounds favorably changes their solubility and biological transmission as compared to non-oxygenated mercaptoalkylamines such as cysteamine. Adminstration of the present compounds may be effected by usual pharmaceutical methods. For example, simply dissolving the amine salts in water gives a pharmaceutically acceptable solution adapted for parenteral administration by injection. Effective dosage levels generally range from 350 to 500 mg. per kg. body weight, calculated in weight of free amine. The amines may if desired be combined with other materials such as copper compounds to achieve additional pharmaceutical and medicinal effects; they may be administered orally, as for example in the form of gelatin capsules; and other variations within the usual skill of the pharmaceutical art may be made.

Additional uses for these compounds include application as chelating agents, as for example to prevent metal ions from precipitating from solution; the compounds containing each of the —SH, —OH and —NH configurations are especially valuable in this connection. Further, they may be used as chemical intermediates, for example by ring closure produced upon treatment with condensing agents such as phosphorus pentoxide, potassium bisulfate, sulfuric acid, aluminum oxide, and the like, to prepare morpholines and thiamorpholines useful, for example, in the preparation of dyes and of pharmaceuticals. The ethers are useful in this connection in providing a non-reactive oxyalkyl group favoring reaction of the mercaptan radical. The tertiary amines are adapted for quaternization to provide bactericidal and detergent products. Oxyalkyl compounds of the invention including higher alkyl radicals, such as the hydrochloride salt of 2-([3-(1-n-butylheptyloxy)propyl]amino)-ethanethiol, can be used as such as surface active agents; the stated compound, which has anomalously low water and high organic solvent solubility, is an unusually effective emulsifying agent. The mercapto and acylthiol functions of these compounds adapt them for use in rubber chemicals, as for example as vulcanizing and curing agents. The various products of the invention can also be employed as agricultural toxicants, to rid soil and plant stands of undesirable vegetation, nematodes, insects and the like.

While the invention has been described with particular reference to various specific embodiments thereof, it is to be appreciated that modifications and variations can be made without departing from the scope of the invention, which is limited only as defined in the appended claims.

What is claimed is:
1. Compounds selected from the class consisting of acyclic mercaptoalkyl oxyalkyl amines of the formula

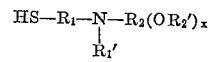

where each R is saturated aliphatic hydrocarbon, each R′ is selected from the class consisting of hydrogen and saturated aliphatic hydrocarbon, and x is an integer of from 1 to 3, and N is separated from other hetero atoms by at least two carbon atoms; and acid addition salts of said amines with protonic acids; where each of said saturated aliphatic hydrocarbon radicals contains up to 18 carbon atoms.

2. Compounds selected from the class consisting of the mercaptoalkyl oxyalkyl amines of claim 1 which are acyclic alkanols; and their acid addition salts with protonic acids.

3. Compounds selected from the class consisting of the alkanols of claim 1 which are monohydric; and their acid addition salts with protonic acids.

4. Compounds selected from the class consisting of 2-[(2-mercaptoethyl)amino]ethanol; and its acid addition salts with protonic acids.

5. Compounds selected from the class consisting of the mercapto oxyalkylamines of claim 1 which are acyclic ethers; and their acid addition salts with protonic acids.

6. Compounds selected from the class consisting of the ethers of claim 5 which are alkoxyalkanols; and their acid addition salts with protonic acids.

7. Compounds selected from the class consisting of 1-[(2-mercaptoethyl)amino]-3-methoxy-2-propanol; and its acid addition salts with protonic acids.

References Cited

UNITED STATES PATENTS

| | | | |
|---|---|---|---|
| 2,913,496 | 11/1959 | Cluff | 260—584 |
| 2,979,504 | 4/1961 | Smith | 260—247.1 |
| 3,004,889 | 10/1961 | Kuna et al. | 167—65 |
| 3,024,166 | 3/1962 | Kuna et al. | 167—65 |

OTHER REFERENCES

Reynolds et al.: Jour. Org. Chem. (December 1961), p. 5126.

CHARLES B. PARKER, *Primary Examiner.*

I. MARCUS, REUBEN EPSTEIN, *Examiners.*

J. W. MOLASKY, A. H. SUTTO, L. A. SEBASTIAN,
*Assistant Examiners.*